United States Patent [19]

Zabler

[11] Patent Number: 4,753,109
[45] Date of Patent: Jun. 28, 1988

[54] SENSOR FOR SCANNING PHYSICAL PROCESSES IN INTERNAL COMBUSTION ENGINES

[75] Inventor: Erich Zabler, Stutensee, Fed. Rep. of Germany

[73] Assignee: Robert Bosch GmbH, Stuttgart, Fed. Rep. of Germany

[21] Appl. No.: 47,987

[22] Filed: May 7, 1987

[30] Foreign Application Priority Data

May 14, 1986 [DE] Fed. Rep. of Germany ....... 3616308

[51] Int. Cl.[4] ........................................... G01M 15/00
[52] U.S. Cl. ........................................ 73/115; 310/338
[58] Field of Search ................ 73/115, 721, 35, 727; 338/42; 310/338

[56] References Cited

U.S. PATENT DOCUMENTS 3,505,862  4/1970  List et al. .............................. 73/115
4,373,399  2/1983  Beloglazov et al. ............. 73/727 X
4,576,052  3/1986  Sugiyama ......................... 73/727 X Primary Examiner—Jerry W. Myracle
Attorney, Agent, or Firm—Michael J. Striker

[57] ABSTRACT

A sensor for scanning physical processes in a combustion chamber of an internal combustion engine includes a pressure-sensitive element formed by two sapphire small parts one of which has a recess and forms a pressure diaphragm to which resistors are applied. The sensor is formed by means of the silicon-on-sapphire technology.

12 Claims, 2 Drawing Sheets

SENSOR FOR SCANNING PHYSICAL PROCESSES IN INTERNAL COMBUSTION ENGINES

BACKGROUND OF THE INVENTION

The present invention relates to a sensor for scanning physical processes in the combustion chamber of an internal combustion engine.

Known sensors of the foregoing type, for example determine pressure in the combustion chamber with the aid of quartz pressure elements. These pressure elements, however are utilizable only at relatively low temperatures. If the quartz pressure element is in addition arranged in the housing wall of the sensor machanical deformations of the housing, which occur at high temperatures, would negatively affect the pressure value.

Also known are the sensors, by means of which with the aid of a photoconductor with a sapphire window at its end, light in the combustion chamber of the engine can be observed. However, additional precise measurements of the pressure in the combustion chamber are extremely difficult to make.

SUMMARY OF THE INVENTION

It is an object of the present invention to provide an improved sensor for scanning physical conditions in a combustion chamber of an internal combustion engine.

It is another object of the invention to provide a sensor of the foregoing type which would be produced by SOS-technology (silicon-on-sapphire).

These and other objects of the invention are attained by a sensor for scanning physical processes in a combustion chamber of an internal combustion engine comprising a housing; at least one pressure-responsive element positioned in said housing and facing said combustion chamber, said pressure-responsive element being formed of alpha-crystalline aluminum-oxide and including strain-responsive resistors applied to said element by the silicon-on-sapphire technology.

The silicon-on-sapphire technology provides static pressure measurements so that the pressure prevailing in the combustion chamber can be determined directly or indirectly by the evaluation of heat compensation.

Due to high temperature stability of the pressure-responsive element, measurements directly at the tip of the sensor facing the combustion chamber are possible. Thereby non-falcified measurement values are obtained.

The housing may be preferably spark plug-shaped. The size of the sensor housing can be maintained very small. With high output of the measured signal and high vibration stability, good precision is obtained.

The pressure responsive element may be freely suspended in said housing at least in the region of said resistors.

The pressure-responsive element may include two sapphire small parts and an insulating member on which said sapphire parts are arranged.

One of said sapphire parts may have a recess forming a pressure diaphragm to which said resistors are applied, another of said sapphire parts closing said recess.

The sensor may further include a photoconductor connected to said another one of said sapphire parts.

The pressure-responsive element is uncoupled from the housing so that no mechanical stresses or deformations of the housing can be transmitted to the pressure diaphragm. At the same time, the second sapphire part which serves to terminate the vacuum reference tension for the pressure-responsive element is usable for direct observation of the combustion chamber. The resistors applied to sapphire can be, at the same time, used for measuring temperatures in the combustion chamber. All important dimensions of the combustion chamber for motor control can be determined in a very simple manner.

The photoconductor may be formed of glass fiber.

The housing may have a recess accommodating said pressure-responsive element, and a cover which covers said recess and has at least two bores; the photoconductor may extend into one of said bores and snugly close said recess with a side of said cover which faces said combustion chamber.

A doped epitaxial layer of silicon, from which doped silicon resistors are produced by etching technique, may be applied to said one sapphire part, and electric conductors may be connected to said resistors, as well as a glass layer insulating and protecting said resistors by silicon-on-sapphire technology.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
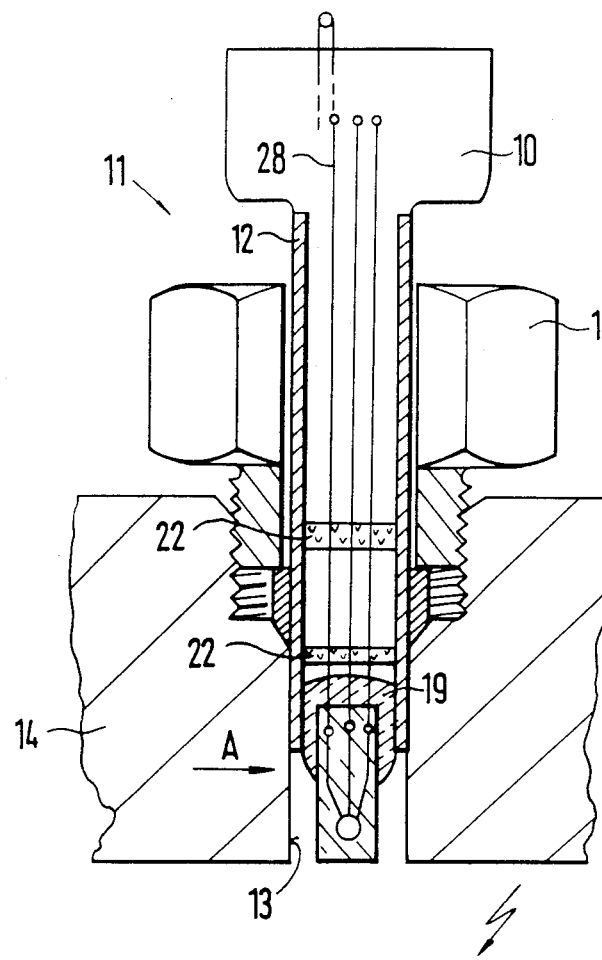
FIG. 1 is an axial sectional view through a combustion chamber side of the sensor.
Figure 1A:
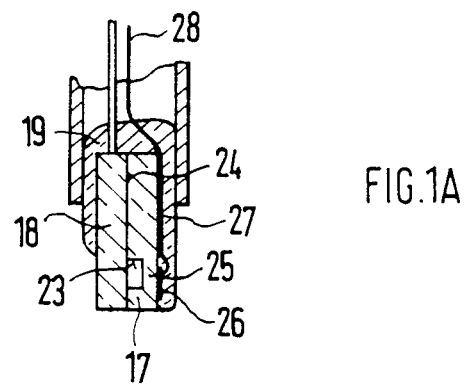
Fig. 1A is a view seen from arrow A of FIG. 1.

As can be seen from FIG. 1 sensor 11 has a housing 10. Sensor 11 serves to measure pressure in the combustion chamber of an internal combustion engine. Housing 10 has a tubular portion 12 which is inserted in a bore 13 of a cylinder head 14. Housing 10 is connected in bore 13 to the cylinder head by means of a bolt 15. In the portion 12, which does not reach the inner wall of the cylinder head 14, are provided two adjacent small sapphire parts 17, 18, which are arranged, as seen from Fig. 1A, in a glazing 19 in the opening facing the combustion chamber. Further, a plurality of layers 22 of insulation ceramics are positioned in the tubular portion 12. The small sapphire parts 17, 18 are snugly closed with the inner wall of the cylinder head 14.

The first sapphire part 17 has a recess 23 which is closed with the second sapphire part 18 as a cover. Both sapphire parts are connected to each other by a glass solder. The recess 23 is mechanically worked in the first small sapphire part 17 and etched. Thereby the so-formed thin plate 25 forms a pressure diaphragm. In the region of this pressure diaphragm 25, are provided on the first sapphire small part 17 strain gauges 26. Recess 23 is at the same time, a vacuum reference for the pressure sensor 26. Electrically conductive paths 27, for example of wolfram or gold lead to electrical conductors 28 and to a non-shown circuit connection. The strain gauges 26 and conductive paths 27 are protected by the glazing 19.

The strain gauges 26 are produced by means of the so-called silicon-on-sapphire technology, abbr. SOS. The SOS technology is known in integrated circuit industry. SOS is a semi-conductor manufacturing technology in which metal-oxide semiconductor devices are constructed in a thin single-crystal silicon film grown on an electrically insulating synthetic sapphire substrate. Advantages include minimizing of parasitic capacitance, low leakage, and higher operating speed. The surfaces, which are not defined for components, are etched away by known treatment methods. The insulated doped silicon resistances which contact with the molybdenum-platinum-metallizing or wolfram-gold-metallizing (conductive paths) are covered with the insulating clarification sheets. Since the semiconductor resistors of sapphire layers are separated from each other the temperature limit of PN transition of the silicon-diffused resistors is reduced. The measuring principle itself is based on the piezoresistive effect, namely the change in the semiconductor resistances under mechanical tension. The so-formed sensor is applicable at the temperatures up to 600 degrees centigrade.

Sensor 11, at the same time, can be utilized for optical observation of the combustion chamber of the engine because a photoconductor 31 of fiber-optical material, for example quartz, is mounted on the second sapphire small part 18. Thereby a simple measurement of the start of ignition is possible.

By resistor 26 on the pressure diaphragm, also, the temperature in the combustion chamber can be determined. It is also conceivable to measure temperatures by additional temperature responsive resistors applied to the sapphire particles 17, 18.

Both sapphire parts 17, 18 are secured only in the glazing 19 and are connected mechanically non-directly with the cylinder head 14. Thus no transmission of mechanical tension via deformations of the housing and during the insertion of the sensor or during pressure measurements is possible. The measured values are therefore very precise. The measuring resistors are uncoupled from the cylinder head 14.

Figure 2:
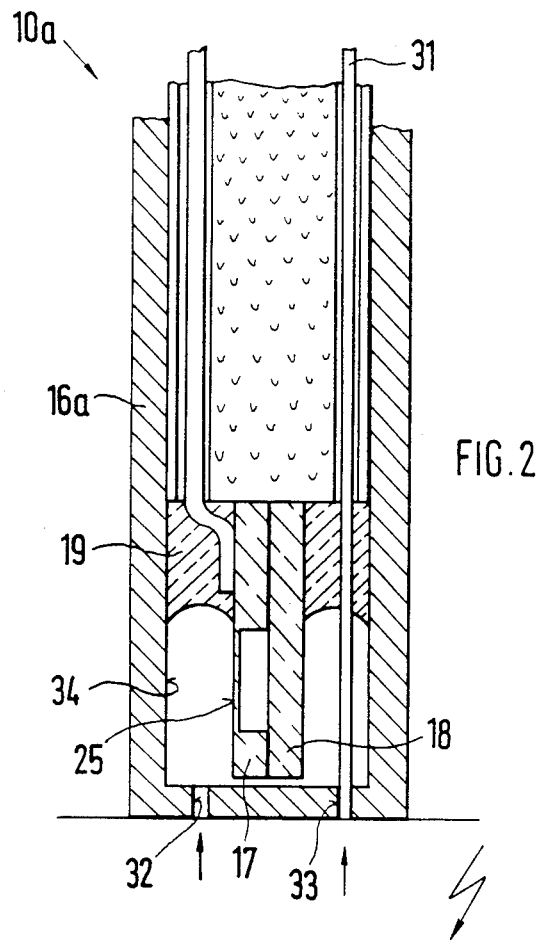
FIG. 2 is an elevated sectional view of a modified embodiment of the invention.
Figure 3:
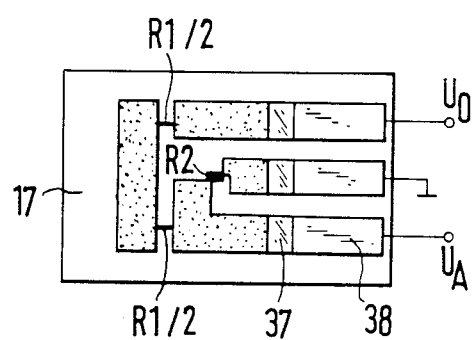
FIG. 3 shows an evaluation circuit.

In the embodiment of FIG. 2 the measurements are possible by a separated arrangement of the measuring element for the combustion chamber pressure and light in the combustion chamber. Similar structural components in FIG. 3 are designated by the same reference numerals as in FIG. 1. The light in the combustion chamber is determined not by the second sapphire small part 18 but by means of a glass fiber 31, for example quartz rod. Eventually also an additional sapphire window before the quartz rod can be placed. The housing 10a of sensor 11a is closed at the front side of portion 16a and has there two parallel bores 32, 33 which open into a recess 34. Two sapphire small parts 17, 18 are rigidly incorporated in the glazing 19 disposed in recess 34. A pressure medium is admitted into recess 34 through the bore 32, and the pressure of the pressure medium acts on the pressure diaphragm 25. The latter is protected in the recess 34. The glass fiber 31 extends through the other bore 33 and closes recess 34 snugly with the front side of housing 10a. Quartz is more affordable than sapphire but however has also such a high stability that it can snugly close recess 34, together with the front side of the housing 16a, and thus protect the combustion chamber. Contamination deposited on the quartz rod or the sapphire window is burned-out itself.

FIG. 3 shows an electric circuit of the strain gauges applied to the sapphire part 17. The conductive paths of silicon are etched out on the sapphire small part 17 by means of the above described SOS-technology. Thin bars serve as resistors R1, R2. These resistors are connected to each other as a voltage divider (half-bridge circuit). Also, a full-bridge circuit can be utilized. Respective wolfram and gold paths 37 and 38 are connected to the resistors. These conductive paths 37, 38 are connectable with an output voltage $U_o$, with the ground and with a tap voltage Us.

During the operation of the sensor in the internal combustion engine the combustion chamber is optically observed by the quartz rod 31. By the selection of the high temperature-resistant materials for light-permeable elements it is ensured that the combustion-chamber-side window is not contaminated and has high mechanical stability.

It will be understood that each of the elements described above, or two or more together, may also find a useful application in other types of sensors for scanning physical processes in engine combustion chambers differing from the types described above.

While the invention has been illustrated and described as embodied in a sensor for scanning physical processes in engine conbustion chambers, it is not intended to be limited to the details shown, since various modifications and structural changes may be made without departing in any way from the spirit of the present invention.

Without further analysis, the foregoing will so fully reveal the gist of the present invention that others can, by applying current knowlidge, readily adapt it for various applications without omitting features that, from the standpoint of prior are, fairly constitute essential characterisitcs of the generic or specific aspects of this invention.

What is claimed as new and desired to be protected by Letters Patent is set forth in the appended claims.

1. In a sensor for scanning physical processes in a combustion chamber of an internal combustion engine, comprising a housing; at least one pressure-responsive element positioned in said housing a facing said combustion chamber, the improvement comprising said pressure-responsive element being formed of alpha-crystalline aluminum-oxide and including strain-responsive resistors (26) applied to said element by silicon-on-sapphire technology, said pressure-responsive element being freely suspended in said housing at least in the region of said resistors.

2. The sensor as defined in claim 1, wherein said housing is spark plug-shaped.

3. The sensor as defined in claim 1, wherein said element includes an insulating member and two small sapphire parts (17,18) which abut one another and are secured in said insulating member so that no mechanical tensions are transmitted from said housing to said sapphire parts.

4. The sensor as defined in claim 3, wherein one of said sapphire parts (17) has a recess (23) forming a cross-piece to which said resistors are applied, another (18) of said sapphire parts closing said recess, said cross-piece constituting a pressure diaphragm.

5. The sensor as defined in claim 4, further including a photo-conductor (31) connected to said another one of said sapphire parts.

6. The sensor as defined in claim 5, wherein said photoconductor is formed of glass fiber.

7. The sensor as defined in claim 4, further including a photoconductor (31) positioned in said housing and facing the combustion chamber for observing light in the same.

8. The sensor as defined in claim 7, wherein said photoconductor is formed of glass fiber.

9. The sensor as defined in claim 4, wherein said housing (10a) has a recess (34) accommodating said pressure-responsive element, and a cover which covers said recess (34) and has at least two bores (32, 33); and further including a photoconductor (31) which extends into one of said bores and snugly closes said recess with a side of said cover which faces said combustion chamber.

10. The sensor as defined in claim 4, further including additional elements for temperature measurements positioned on said pressure-responsive element.

11. The sensor as defined in claim 4, wherein a doped epitaxial layer of silicon, from which doped silicon resistors are produced by etching technique, is applied to said one sapphire part, and further including electric conductors (28) connected to said resistors, and a glass layer insulating and protecting said resistors by silicon-on-sapphire technology.

12. The sensor as defined in claim 3, wherein said insulating member is made of glazing.

* * * * *